(12) United States Patent
Tiana et al.

(10) Patent No.: US 9,347,794 B1
(45) Date of Patent: May 24, 2016

(54) IMAGE DATA COMBINING SYSTEMS AND METHODS OF MULTIPLE VISION SYSTEMS

(71) Applicant: Rockwell Collins, Inc., Cedar Rapids, IA (US)

(72) Inventors: Carlo A. Tiana, Portland, OR (US); Douglas A. Bell, Marion, IA (US); Timothy J. Etherington, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 177 days.

(21) Appl. No.: 13/624,335

(22) Filed: Sep. 21, 2012

(51) Int. Cl.
*G01C 23/00* (2006.01)
*G02B 27/01* (2006.01)

(52) U.S. Cl.
CPC ...................................... *G01C 23/00* (2013.01)

(58) Field of Classification Search
CPC ...... G01C 23/00; G02B 27/014; G02B 27/01; G02B 27/0138
USPC ......... 340/374, 980, 9; 701/14; 345/8, 9, 427; 382/154, 619
See application file for complete search history.

(56) References Cited

U.S. PATENT DOCUMENTS

| 6,232,602 | B1 | 5/2001 | Kerr | |
|---|---|---|---|---|
| 6,373,055 | B1 | 4/2002 | Kerr | |
| 6,806,469 | B2 | 10/2004 | Kerr | |
| 6,898,331 | B2 | 5/2005 | Tiana | |
| 6,950,037 | B1 * | 9/2005 | Clavier et al. | 340/945 |
| 7,089,092 | B1 * | 8/2006 | Wood et al. | 701/14 |
| 7,102,130 | B2 | 9/2006 | Kerr | |
| 7,180,476 | B1 * | 2/2007 | Guell et al. | 345/7 |
| 7,196,329 | B1 | 3/2007 | Wood et al. | |
| 7,605,719 | B1 * | 10/2009 | Wenger et al. | 340/974 |
| 7,617,022 | B1 | 11/2009 | Wood et al. | |
| 7,655,908 | B2 * | 2/2010 | Kerr | 250/330 |
| 8,400,330 | B2 * | 3/2013 | He et al. | 340/960 |
| 2009/0040070 | A1 * | 2/2009 | Alter et al. | 340/945 |
| 2013/0188049 | A1 * | 7/2013 | Koukol | G06T 7/0044 348/144 |

OTHER PUBLICATIONS

Norman Tarleton et al., PMMW/DGPS/GPS Integrated Situation Awareness System, Apr. 1998.*

* cited by examiner

*Primary Examiner* — Jennifer Mehmood
*Assistant Examiner* — Omar Casillashernandez
(74) *Attorney, Agent, or Firm* — Daniel M. Barbieri; Donna P. Suchy; Angel N. Gerdzhikov

(57) ABSTRACT

Present novel and non-trivial systems and methods for combining image data received from two or more vision systems are disclosed. In one embodiment, an image generator receives navigation data representative of at least one surface of interest (e.g., runway of intended landing) and aircraft position, retrieves navigation reference data representative of surface information, creates zone data representative of a lighting awareness zone for each surface of interest, receives first image data from a first source and second image data from a second source, identifies third image data from the first image data and the zone data, generates fourth image data from the second and third image data, and provides the fourth image data to a display system, thereby increasing situational awareness by enhancing the pilot's ability to detect or recognize the runway environment.

22 Claims, 11 Drawing Sheets

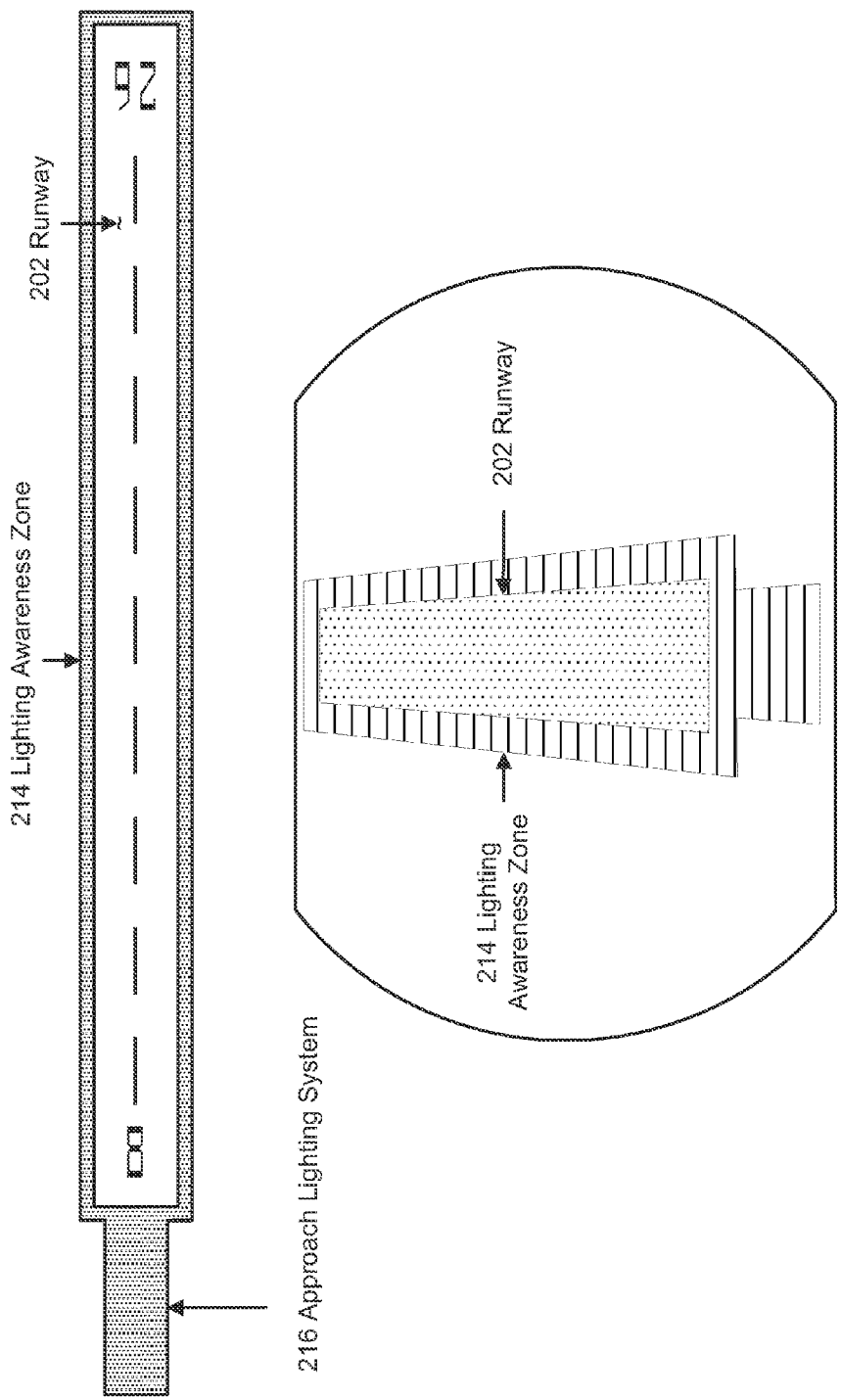

IMAGE DATA COMBINING SYSTEMS AND METHODS OF MULTIPLE VISION SYSTEMS

BACKGROUND OF THE INVENTION

1. Field of the Invention

This invention pertains generally to the field of image display systems such as, but not limited to, aircraft display systems.

2. Description of the Related Art

Fusion algorithms for "fusing" together multiple image data sets generated from enhanced vision systems have been employed to aid and/or enhance a pilot's ability to "see" the scene in front of the aircraft by allowing him or her to view an image of the scene outside the aircraft without actually being able to see the actual scene. Many of the fusion algorithms perform a pixel-by-pixel determination to create a single composite image.

This may be a problem when multiple sensors of an enhanced vision system are used, where unwanted noise may be introduced when data is combined or fused together. Unwanted noise may impede the value of another sensor, thereby compromising the performance of other sensors. As a result, the image presented to the pilot may be compromised, thereby negatively affecting his or her situational awareness gained by his or her ability to see, detect, and/or recognize a runway environment during a period of low visibility.

BRIEF SUMMARY OF THE INVENTION

The embodiments disclosed herein present novel and non-trivial systems and methods for combining image data. With the embodiments disclosed herein, a pilot's situational awareness is increased by enhancing the pilot's ability to detect and recognize one or more lighting systems employed in the runway environment of an airport.

In one embodiment, a system for combining image data is disclosed. The system may be comprised of a navigation data source, a navigation reference data source, a first image data source, a second image data source, an image generator ("IG"), and a display system. The system could also be comprised of a third image data source.

In another embodiment, a method for combining image data is disclosed. The method may be comprised of receiving navigation data; receiving navigation reference data representative of one or more surfaces of interest; creating zone data representative of a landing awareness zone for each surface of interest; receiving first and second image data from different sources; identifying third image data from the first image data and zone data, where the third image data could be comprised of the first image data falling within the landing awareness zone; generating fourth image data from the second image data and the third image data, where acceptable information content of the third image data could be used in the generation; and providing the fourth image data to a display system comprised of one or more display units.

In another embodiment, a second system for combining image data is disclosed. The system may be comprised of a navigation data source, a navigation reference data source, a first image data source, a second image data source, an IG, and a display system.

In another embodiment, a second method for combining image data is disclosed. The method may be comprised of receiving navigation data; receiving navigation reference data representative of one or more surfaces of interest; receiving first image data representative of lights of at least one lighting system employed for each surface of interest from a first source; receiving second image data from a second source; generating third image data from the first image data and the second image data; and providing the third image data to a display system comprised of one or more display units.

BRIEF DESCRIPTION OF THE DRAWINGS

The drawings of FIG. 1 depict a functional block diagram of a system for combining image data.

FIGS. 4A through 4C depict three examples of landing awareness zones.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
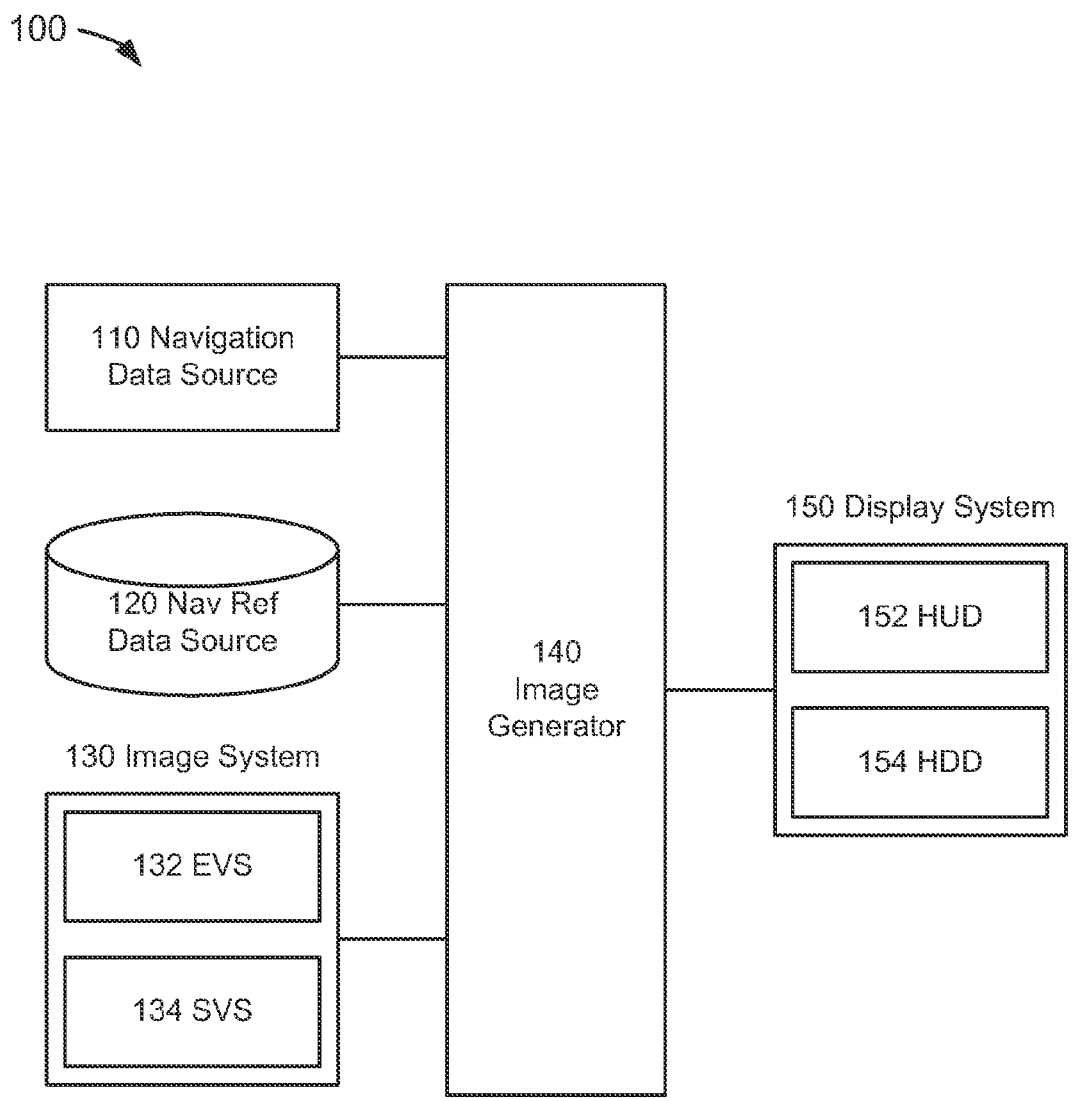

FIG. 1 depicts a functional block diagram of an image data combining system 100 suitable for implementation of the techniques described herein. The functional blocks of the system may include a navigation data source 110, a reference data source 120, an image system 130, an image generator ("IG") 140, and a display system 150.

In an embodiment of FIG. 1, the navigation data source 110 could be comprised of a system or systems that provide navigation data information in an aircraft. For the purposes of the disclosures discussed herein, an aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position 112, altitude 114, heading 116, and attitude 118. As embodied herein, aircraft position includes geographic position (e.g., latitude and longitude coordinates), altitude, or both. As embodied herein, aircraft orientation may include pitch, roll, and/or yaw information related to the attitude of the aircraft. The navigation data source 110 could provide the navigation data to the IG 140 for subsequent processing as discussed herein.

As embodied herein, the navigation data source 110 could also include a flight management system ("FMS") which could perform a variety of functions performed to help the crew in the management of the flight; these functions are known to those skilled in the art. These functions could include maintaining the current location of the aircraft and/or receiving and storing flight plan information such as, but not limited to, the identification of the runway of intended landing (i.e., a surface of interest).

In an embodiment of FIG. 1, the reference data source 120 could be comprised of any source of reference point data. The reference data source 120 could be comprised of a flight navigation database that may be part of the FMS and/or a taxi navigation database.

It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

A flight navigation database may contain records which provide reference data such as, but not limited to, surface data for taxiways and runways. It may be employed for delineating the boundaries of at least one lighting awareness zone ("LAZ"). In one embodiment, runway information contained in a runway record from a flight navigation database employing standards of the ARINC 424 specification (a standard known to those skilled in the art) could be used to derive four corners of the runway from which the boundaries of the LAZ could be delineated. For example, fields of the runway record include data representative of, but not limited to, the landing threshold point ("LTP"), the elevation of the LTP, runway width, the magnetic bearing, and the magnetic variation of the runway. The four corners of a runway may be determined using one or more combinations of these. The determination of the location of the four corners may be used to derive the inner boundaries of the LAZ. A discussion of how a data contained in a runway record may be used to derive a delineation of a runway (and a runway awareness zone) has been provided by Rathinam et al in U.S. Pat. No. 9,189,964 entitled "System, Module, and Method for Presenting Runway Traffic Information."

A taxi navigation database could be comprised of airport data representative of, in part, airport surfaces and airport visual aids; an example of a taxi navigation database is described by Krenz et al in U.S. Pat. No. 7,974,773. In addition, the reference data source 120 could be a database that could store location data representative of a plurality of surface locations that define at least one feature such as, but not limited to, surface edges and/or boundaries, surface centerlines, and/or surface hold-short lines. The taxi navigation database could comprise an aerodrome mapping database ("AMDB") as described in the following document published by RTCA, Incorporated: RTCA DO-272A entitled "User Requirements for Aerodrome Mapping Information." From this information, locations for inner boundaries of the LAZ may be derived.

DO-272A provides for aerodrome surface mapping requirements for aeronautical uses particularly on-board aircraft. Those skilled in the art appreciate that these standards (as well as the ARINC 424 standards) may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB or FMS database.

Although the preceding discussion has been drawn to using an FMS database and an AMDB to derive inner boundaries of an LAZ, a derivation technique may not be necessary when data representative of an LAZ is predetermined and stored by the reference data source 120; for example, the latitude/longitude coordinates used for delineating the boundaries of the LAZ for each surface at an airport could have been predetermined prior to the flight and stored.

Additionally, information related to a runway lighting system ("RLS") and/or an approach lighting system ("ALS") for each surface of interest could be stored in the reference data source 120. An ALS could be any system installed on the approach end of a runway and comprised of a series of light bars, strobe lights, or any combination of these that extend outward from the threshold of the runway.

There are many configurations of RLSs that are known to those skilled in the art. A non-exhaustive list includes: runway end lights, runway edge lights, runway centerline lighting systems, touchdown zone lights, taxiway centerline lead-off lights, taxiway centerline lead-on lights, and land and hold short lights.

Similarly, there are many configurations of ALSs that are known to those skilled in the art. A non-exhaustive list includes: a medium-intensity ALS with runway alignment indicator lights (MALSR), medium-intensity ALS with sequenced flashing lights (MALSF), simple ALS (SALS), simplified short ALS (SSALS), simplified short ALS with runway alignment indicator lights (SSALR), simplified short ALS with sequenced flashing lights (SSALF), omnidirectional ALS (ODALS), two configurations of an ALS with sequenced flashing lights (ALSF), two configurations of an ICAO-compliant high intensity ALS (ICAO HIALS), lead-in lighting (LDIN), runway end identification lights (REIL), and/or runway alignment indicator lights (RAIL).

The runway lighting and ALS may be designed and installed following specifications and/or standards employed by aviation-governing authorities. If data is representative of the type of ALS that is employed for a surface of interest, then an LAZ could be derived using these standards. Alternatively, a derivation technique may not be necessary when data representative of an ALS is stored; for example, the latitude/longitude coordinates used for delineating the boundaries of the ALS and/or components thereof for each surface at an airport could have been predetermined prior to the flight and stored. Alternatively, data representative of an LAZ could include data representative of an ALS.

As embodied herein, an LAZ could be established with or without the use of a derivation technique. As embodied herein, the reference data source 120 could provide reference point data to the IG 140 for subsequent processing as discussed herein.

In an embodiment of FIG. 1, the image system 130 may be comprised of any system configured to acquire a real-world image of the scene outside the aircraft. Two such systems include an enhanced vision system ("EVS") 132 and a synthetic vision system ("SVS") 134. At least one infrared camera may be mounted on the aircraft for detecting infrared radiation emanating from the scene in front of the aircraft. Alternatively, at least one sensor may be mounted on the aircraft to detect non-visible, near-infrared radiation such as that emitted from lights located in the runway environment. Other types of sensors suitable for detection of airport features may further be deployed; for example, a radar antenna used by an aircraft radar system could be employed for detecting airport lighting features such as an ALS. The EVS 132 may also employ a display-generating processor that may be operationally connected to the sensors to create a representation of the scene in front of the aircraft for display of display units of the aircraft's indicating system. An example of an EVS has been disclosed by Wood et al in U.S. Pat. No. 7,196,329 and by Wenger et al in U.S. Pat. No. 7,605,719.

The EVS 132 may be comprised of, in part, one or more infrared cameras and/or sensors and in internal processor. Each infrared camera and/or sensor may be configured to detect non-visible, near-infrared radiation such as that emitted by many lights and lighting systems. Each infrared camera and/or sensor could be configured to receive or acquire image data ("enhanced image data") representative of the actual scene outside the aircraft that may be obscured from the pilot's view.

Those skilled in the art understand that at least two types of sensors can be employed by the EVS 132. A short-wavelength infrared ("SWIR") sensor may be designed to work within the electromagnetic spectrum bandwidth of 1.4 to 3 micrometers; along with other sensors, the SWIR sensor may be used to detect lights. A long-wavelength infrared ("LWIR") sensor may be designed to work with the bandwidth of 8 to 15 micrometers; the LWIR sensor, along with other sensors, may be used to detect thermal differences. Although the discussion herein may be drawn to SWIR and LWIR sensors, the disclosures presented herein are not limited to sensors occupying these ranges of the electromagnetic spectrum but may be applied to any device(s) from which an image may be acquired. The SWIR sensor could be suitable for capturing runway edge lighting, lighting of an ALS, and obstacle lighting. The LWIR sensor could be suitable for capturing ambient background and terrain features which may tend to radiate heat into the atmosphere. This enhanced image data acquired by the sensors could be provided to the internal processor of the EVS that could be programmed, in part, to prepare the enhanced image data received from each infrared camera and/or sensor before being provided to the IG 140 for subsequent processing as herein.

The SVS 134 may be comprised of a terrain database for creating a three-dimensional perspective of the scene outside the aircraft. When provided with data from the navigation data source 110, the SVS 134 may be configured to generate synthetic image data representative of a three-dimensional perspective of the scene outside the aircraft by techniques known to those skilled in the art. The SVS 134 could provide synthetic image data to the IG 140 for subsequent processing as discussed herein.

In an embodiment of FIG. 1, the IG 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 140 may be driven by the execution of software or computer instruction code containing algorithms developed for the specific functions embodied herein. The IG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the IG 140 could be a processor(s) used by or in conjunction with any other system of the aircraft including, but not limited to, the navigation data source 110, the reference data source 120, the image system 130, the display system 150, or any combination thereof.

The IG 140 may be programmed or configured to receive as input data representative of information obtained from various systems and/or sources including, but not limited to, the navigation data source 110, the reference data source 120, and the image system 130. As embodied herein, the terms "programmed" and "configured" are synonymous. The IG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The IG 140 may be programmed or configured to execute one or both of the methods discussed in detail below. The IG 140 may be programmed or configured to provide output data to various systems and/or units including, but not limited to, the display system 150.

In an embodiment of FIG. 1, the display system 150 may receive image data from the IG 140. The display system 150 could include any unit that provides symbology of tactical flight information including, but not limited to, a Head-Up Display ("HUD") unit 152 and/or a Head-Down Display ("HDD") unit 154. As embodied herein, the disclosures may be applied to one or more portable devices including, but not limited to, laptop computer, smartphone, and/or tablets which employ a display unit configured to receive the image data.

The HUD unit 152 may present tactical information to the pilot or flight crew—information relevant to the instant or immediate control of the aircraft, whether the aircraft is in flight or on the ground. The HUD unit 152 provides tactical information to the pilot or flight crew in the pilot's forward field of view through the windshield, eliminating transitions between head-down to head-up flying. The HUD unit 152 displays the same information found on a primary flight display ("PFD"), such as "basic T" information (i.e., airspeed, attitude, altitude, and heading). Although it provides the same information as that of a PFD, the HUD unit 152 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The HUD unit 152 is designed to provide flexible configurations which may be tailored to the desired configuration specified by a buyer or user of the aircraft.

The HDD unit 154 provides tactical information to the pilot or flight crew and is typically a unit mounted to an aircraft's flight instrument panel located in front of a pilot and below the windshield. Similar to the HUD unit 152, the HDD unit 154 may be tailored to the desired configuration specified by a buyer or user of the aircraft. As embodied herein, the HUD unit 152, the HDD unit 154, or any display unit could receive an image data set from the IG 140 for subsequent presentation.

Figure 2A:
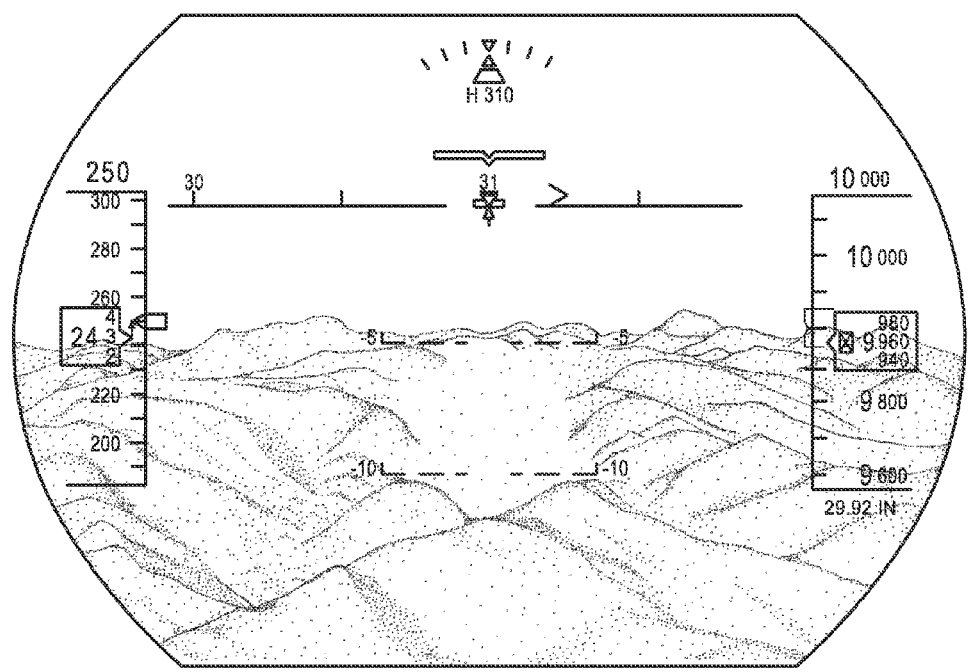
FIGS. 2A and 2B depict a head-up display ("HUD") unit and a head-down display ("HDD") unit.
Figure 2B:
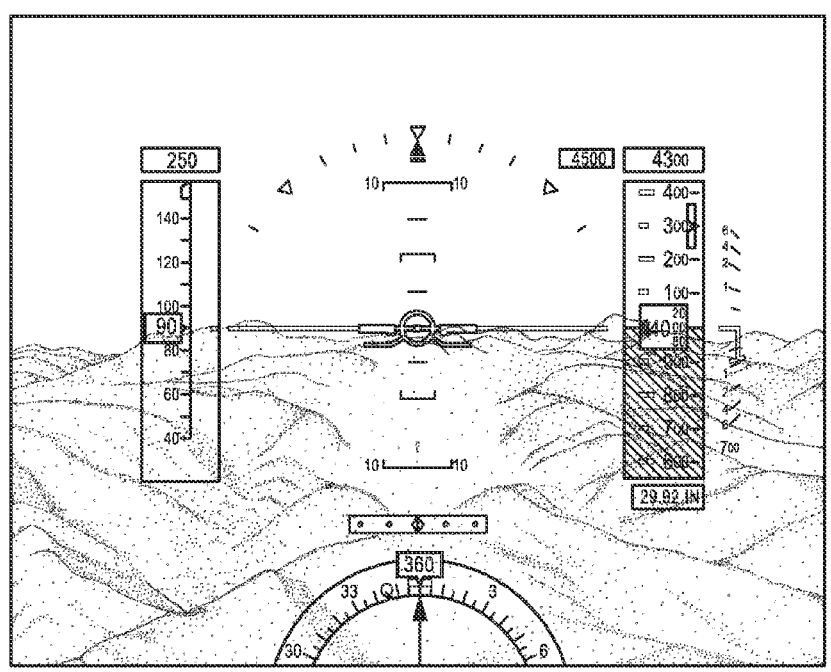
Figure 3A:
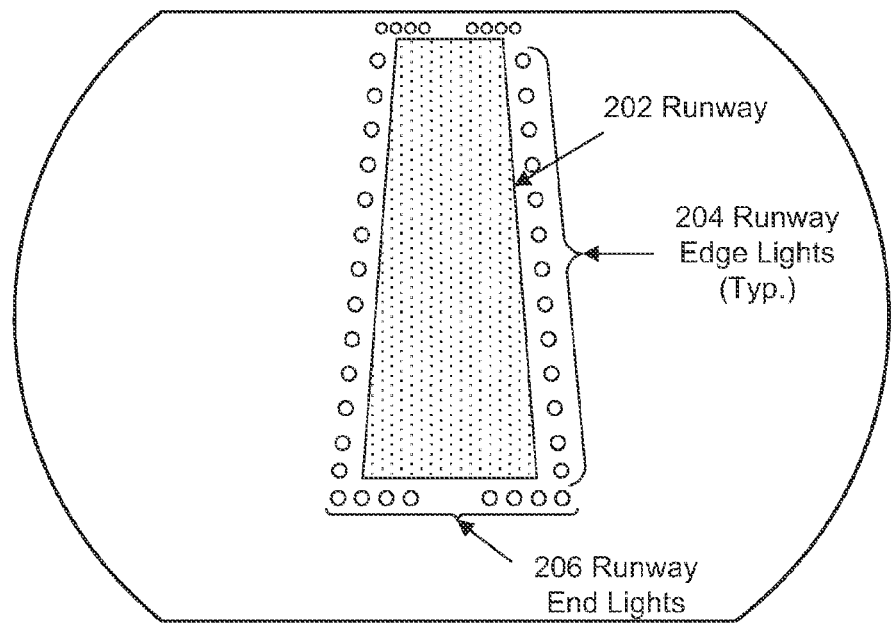
FIG. 3A depicts a scene in front of an aircraft as viewed through the HUD unit.
Figure 3B:
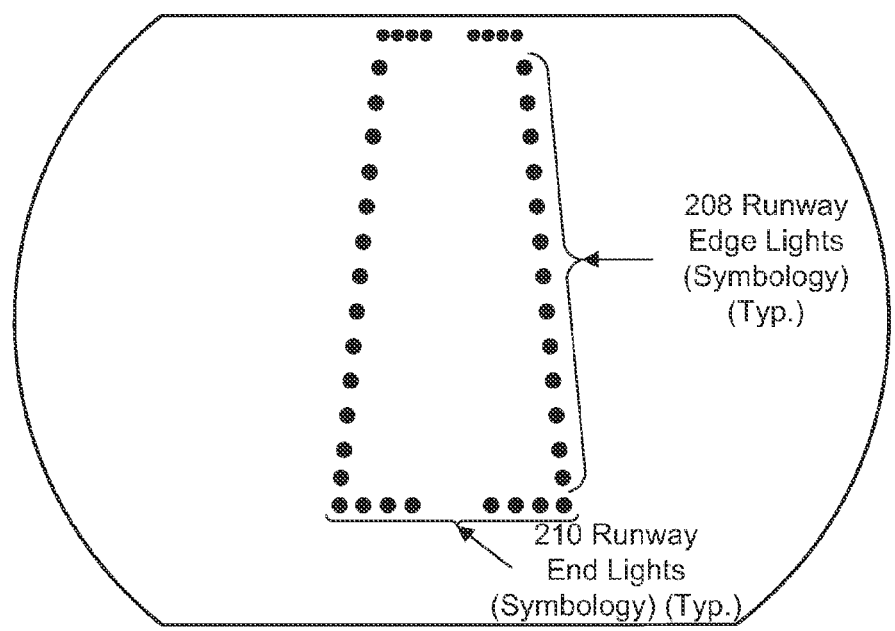
FIG. 3B depicts runway lighting symbology as presented on the HUD unit.

Proceeding to FIGS. 3A and 3B, examples are provided to illustrate how lighting systems and symbology indicative of those systems could appear to the viewer looking through a HUD unit. It should be noted that in the depictions of HUD units that follow, the tactical information that was presented in FIG. 2A has been omitted for the sake of presentation and clarity and is not indicative of the plurality of indications or information with which it may be configured with the embodiments disclosed herein. Moreover, for the sake of discussion and illustration, the images shown herein are not drawn to scale and have been intentionally exaggerated.

Referring to FIG. 3A, a runway 202 (shown without surface markings), runway edge lights 204, and runway end lights 206 are viewed through the HUD unit as they could appear in the scene in front of the aircraft. As shown in FIG. 3B, symbology representative of the runway edge lights 208 and runway end lights 210 is shown on the HUD unit (without the scene in front of the aircraft). Although the following discussion will be drawn to runway edge lights, runway end lights, and an unspecified ALS, the embodiments disclosed herein may be applied to other runway lighting and ALSs.

Figure 4A:
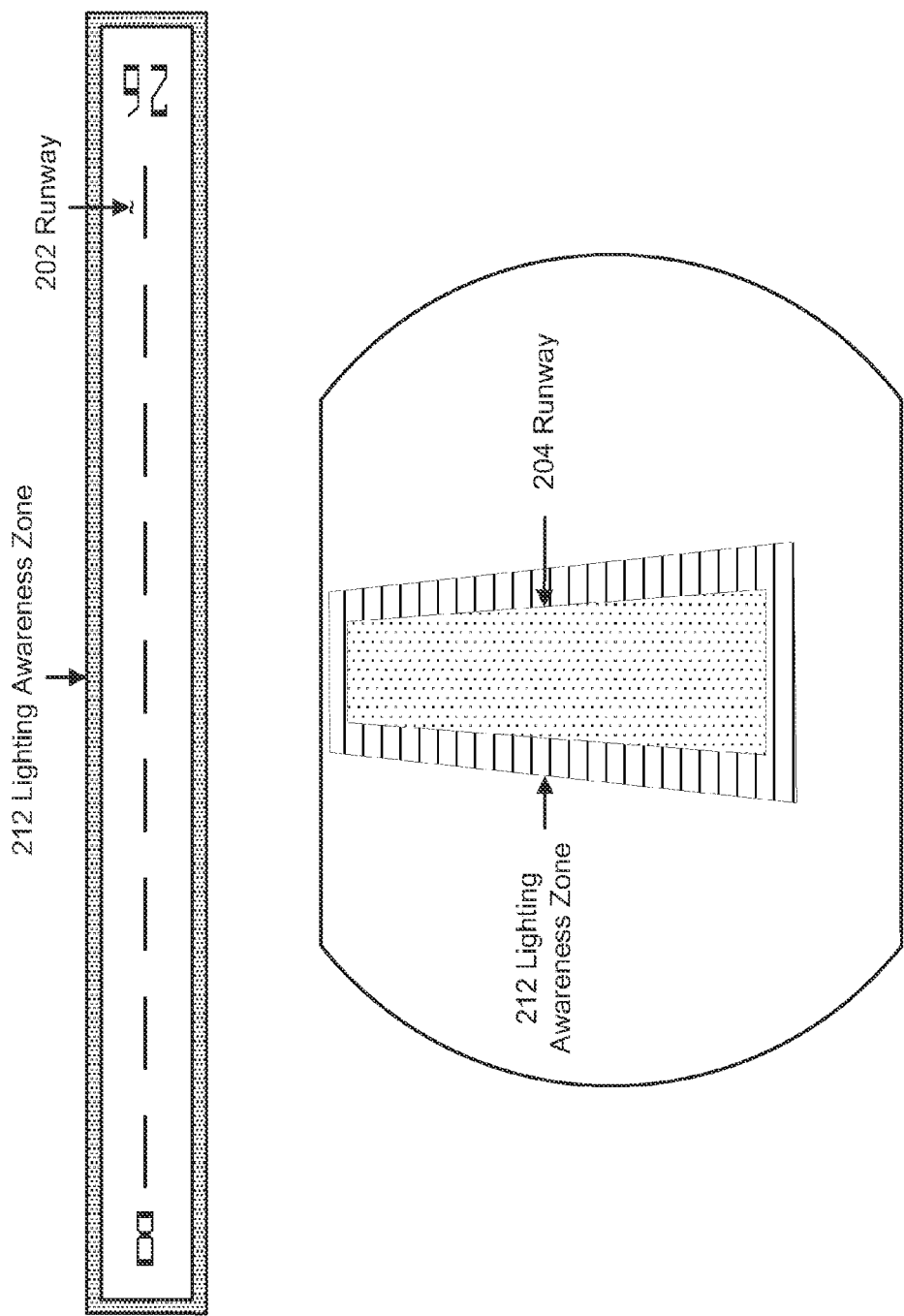

The advantages and benefits of the embodiments discussed herein may be illustrated by showing examples of how LAZs may be defined and used for the construction of a visual aid for the pilot. Referring to FIG. 4A, an example of an LAZ 212 corresponding to a runway 202 is illustrated. The inner boundary of the LAZ 212 is shown as sharing the same boundary as the runway edges and runway ends, and the outer boundary is shown as a fixed distance from the inner boundary in four directions. As embodied herein, it is not necessary for the inner boundary to coincide with the runway edges/ ends or for the outer boundary to be a fixed distance from the inner boundary. A manufacturer and/or end-user may configure an LAZ to its own specification.

Referring to FIG. 4B, an LAZ 214 is comprised of an area surrounding the runway 202 (as the LAZ 212) and a rectangular area in which an ALS 216 may occupy the approach end of Runway 8. Here, a manufacturer and/or end-user may determine the size of the rectangular area to encompass the area in which the actual approach landing system assigned to the runway encompasses. Moreover, if the actual placement of each of the lights used in the approach landing system is known or may be derived, the rectangular area could be replaced with the actual shapes that coincide with the actual, surveyed locations of the lights.

Figure 4C:
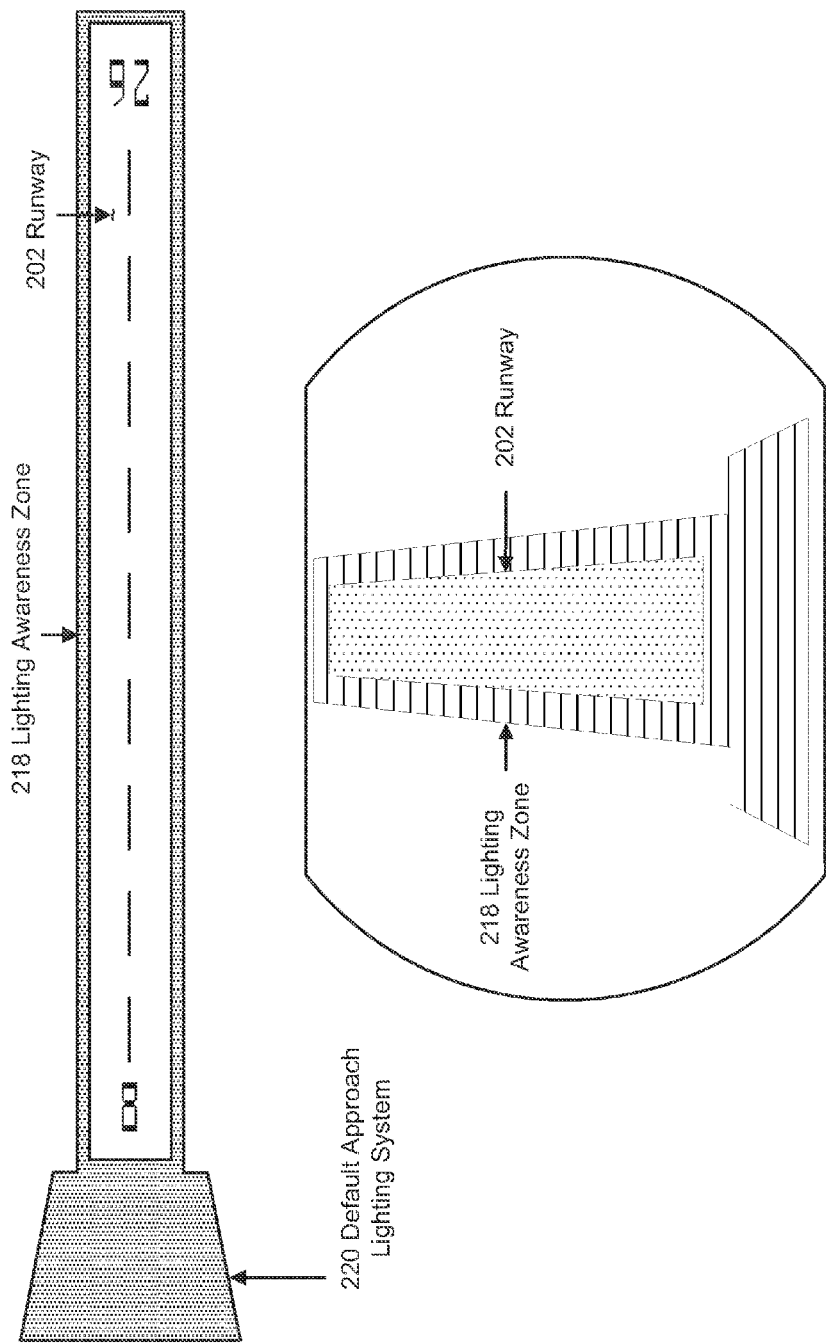

Referring to FIG. 4C, an LAZ 218 is comprised of an area surrounding the runway 202 and a trapezoidal area of a default ALS 220 that could be used by default if the type of ALS is unknown, unspecified, or not employed. Alternatively, a manufacturer and/or end-user could have opted for a larger area to not only encompass any actual or possible ALS but also add a buffer as an additional layer of safety. As embodied herein, the trapezoidal shape is used to represent any shape that a manufacturer and/or end-user may choose to employ.

Figure 5A:
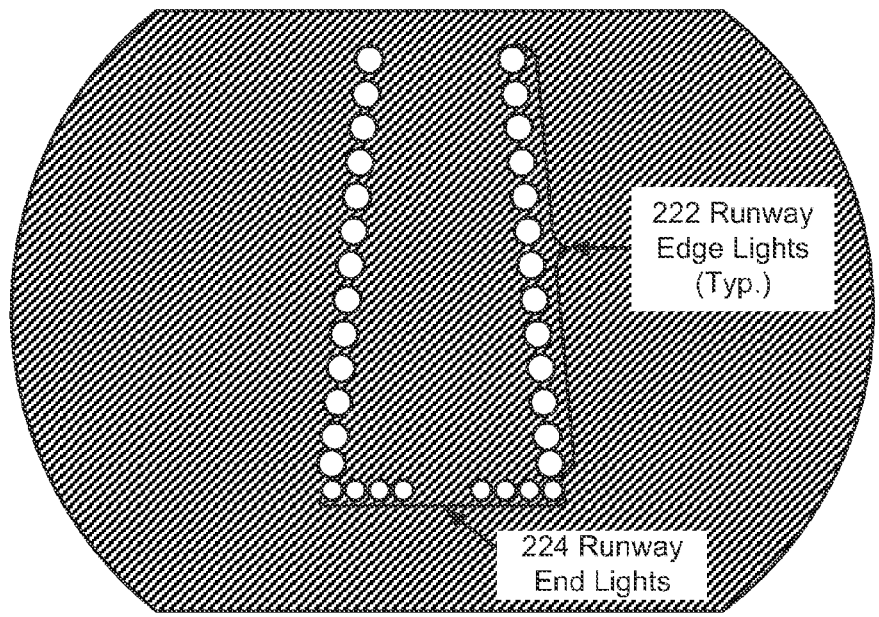
FIG. 5A illustrates an image represented in first enhanced image data.

Images generated by the EVS 132 may be presented on the HUD unit. Referring to FIG. 5A, a first illustrative EVS image is shown. As observed, first enhanced image data representative of the EVS image may have been acquired by the EVS 132. Because only the glow of the runway edge lights 222 and runway end lights 224 has been acquired, this may be indicative that the EVS has been configured with SWIR sensor(s).

Figure 5B:
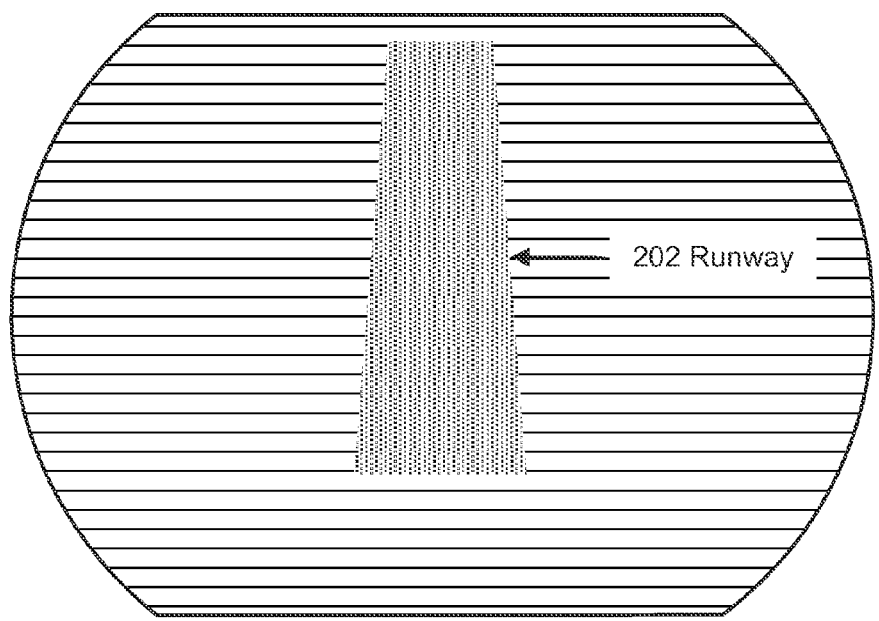
FIG. 5B illustrates an image represented in second enhanced image data.

Referring to FIG. 5B, a second illustrative EVS image is shown. Similar to FIG. 5A, second enhanced image data representative of the EVS image may have been acquired by the EVS 132 in FIG. 5B. Knowing that the scene in front of the aircraft includes a runway, the absence of runway edge lights and runway end lights may be indicative of an EVS not configured with SWIR sensor(s); instead, if it is assumed that heat dissipates from the surface of a runway at a different rate than the surface of the terrain surrounding the runway 202, the EVS 132 configured with LWIR sensor(s) may be indicated by the image.

Figure 5C:
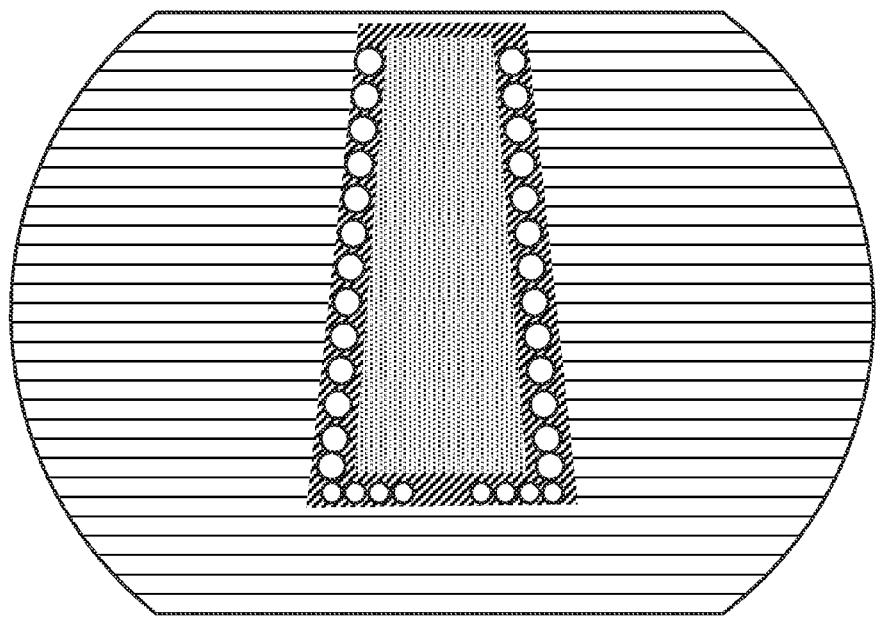
FIG. 5C illustrates an image represented as a combination of first and second enhanced data.
Figure 5D:
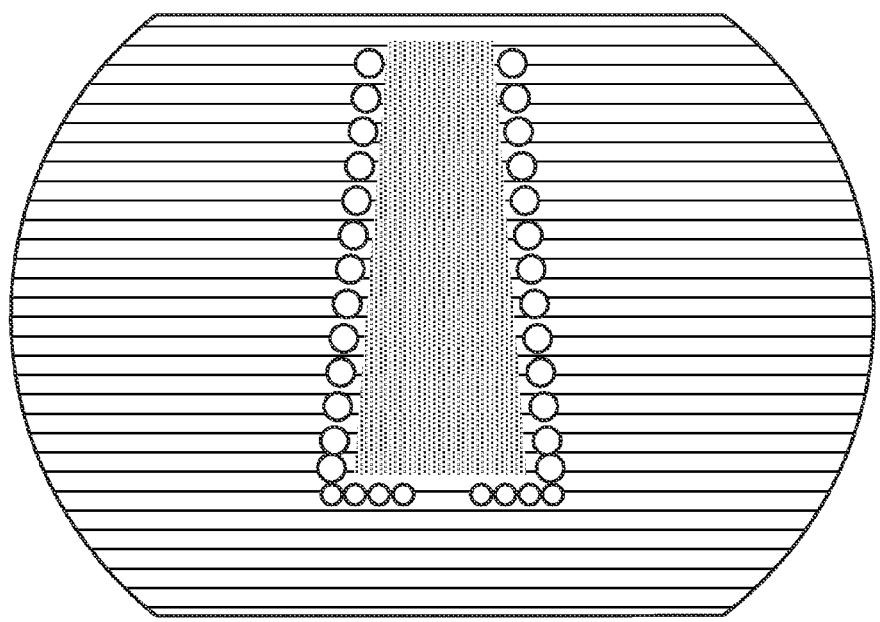
FIG. 5D illustrates an image represented as a combination of first and second enhanced data using acceptable information content of the first enhanced image data.

For the purpose of illustrating the disclosures presented herein, IG 140 may be programmed to establish the LAZ 212 of FIG. 4A and apply it to the first enhanced image data in order to identify the data which falls within the area of the LAZ 212. By comparing FIG. 4A to 5A, it is observed that the glow of the runway edge lights 222 and runway end lights 224 of FIG. 4A falls within the area of the LAZ 212. Once the identification has been performed, the IG 140 may be programmed to replace the second enhanced image data corresponding to the LAZ 212 with the first enhanced image data that has been identified. As a result, the image represented in the modified second enhanced image data may be presented on the HUD unit as shown in FIG. 5C.

Additionally, once the identification has been performed, the IG 140 may be programmed to determine information content of the first enhanced image data falling within the LAZ 212 and classify the content as being acceptable or unacceptable, where the content may be classified as acceptable if it corresponds to an acquisition of light by the EVS 132. Then, the first enhanced image data corresponding to the acceptable information content may be placed over corresponding second image data, resulting with the image of FIG. 5D being presented on the HUD unit.

Figure 5E:
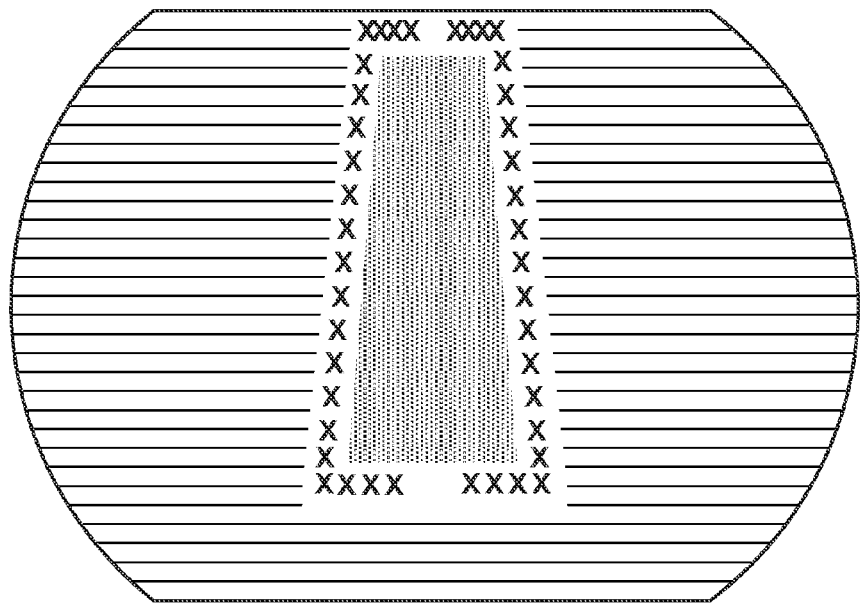
FIG. 5E illustrates an image represented as a combination of synthetic data and the second enhanced data.

The SVS 134 may also be used to provide a visual aid of runway environment lighting (each light is indicated as an "X"). The IG 140 may be programmed to establish the LAZ 212 of FIG. 4A and apply it to the synthetic image data generated by the SVS 134 in order to identify the data which falls within the area of the LAZ 212. Once the identification has been performed, the IG 140 may be programmed to replace the second enhanced image data corresponding to the LAZ 212 with the synthetic image data that has been identified. As a result, the image represented in the modified second enhanced image data may be presented on the HUD unit as shown in FIG. 5E.

Figure 5F:
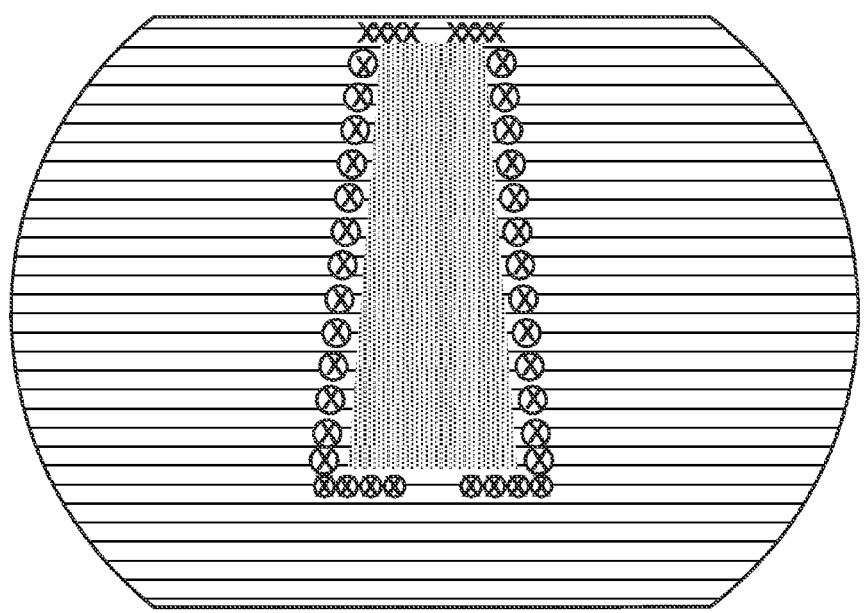
FIG. 5F illustrates an image represented as a combination the synthetic data and enhanced data.

Alternatively, the SVS 134 may be configured to generate synthetic image data based upon navigation reference data retrieved by the SVS 134, where such synthetic image data may be representative of the lights of one or more lighting system employed for each runway of interest. Then, the synthetic image data may be placed over corresponding second image data, resulting with the image of FIG. 5F being presented on the HUD unit. As shown in FIG. 5F, the synthetic image of the runway edge lights and runway end lights is presented against the background of the combined EVS image of FIG. 5D, resulting in a minimal loss of the enhanced image. Alternatively, the synthetic image of the runway edge lights and runway end lights could be presented against the background of the single EVS image of FIG. 5A.

Although the previous examples of FIGS. 5A through 5F have been drawn to LAZs corresponding to runway edge lights and runway end lights, the embodiments disclosed herein are not limited to these lights. To the contrary, they may be applied to lighting systems employed in the runway environment such as, but not limited to, other RLSs and ALSs.

Figure 6:
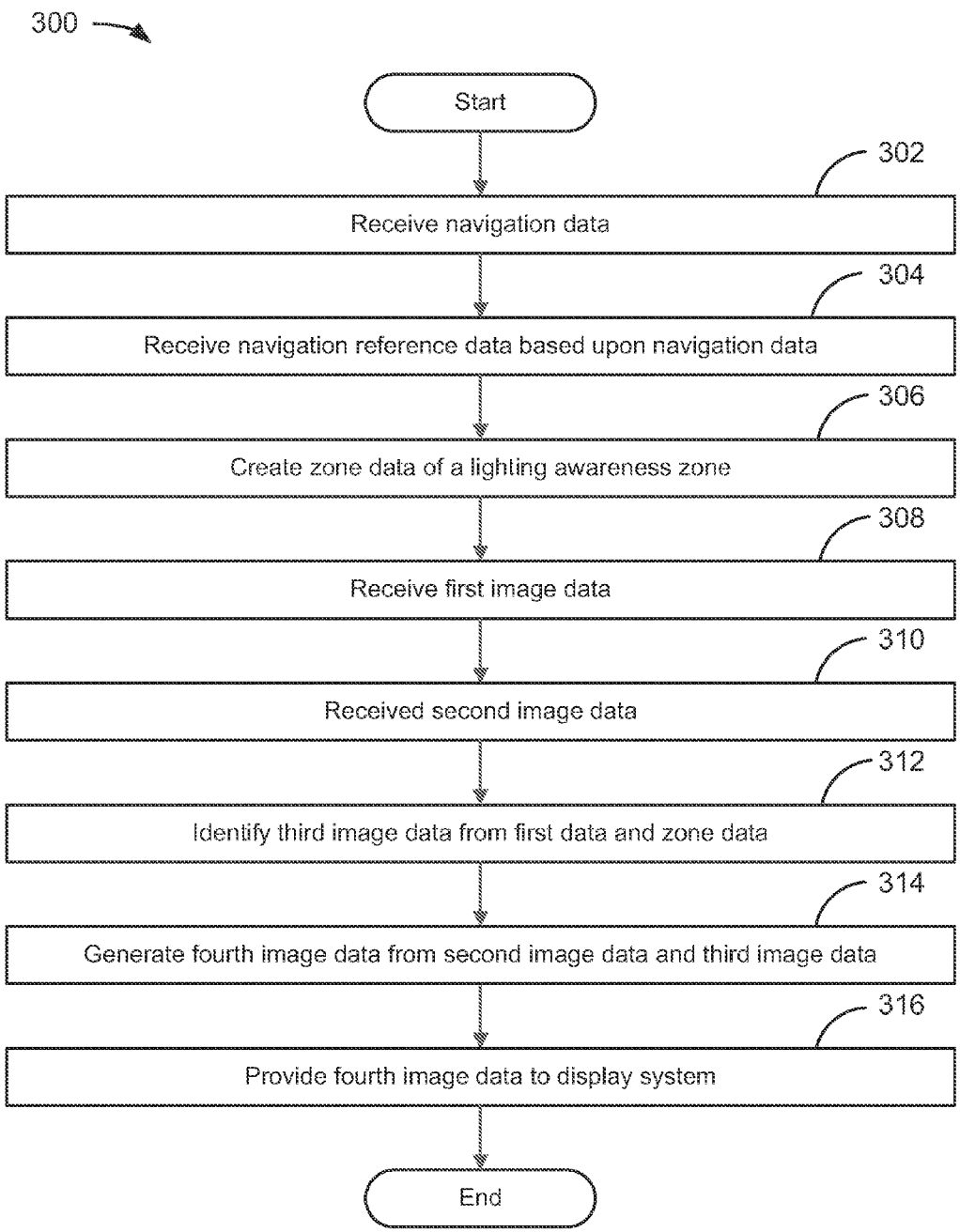
FIG. 6 depicts a flow chart of a method for combining image data received from multiple vision systems.
Figure 7:
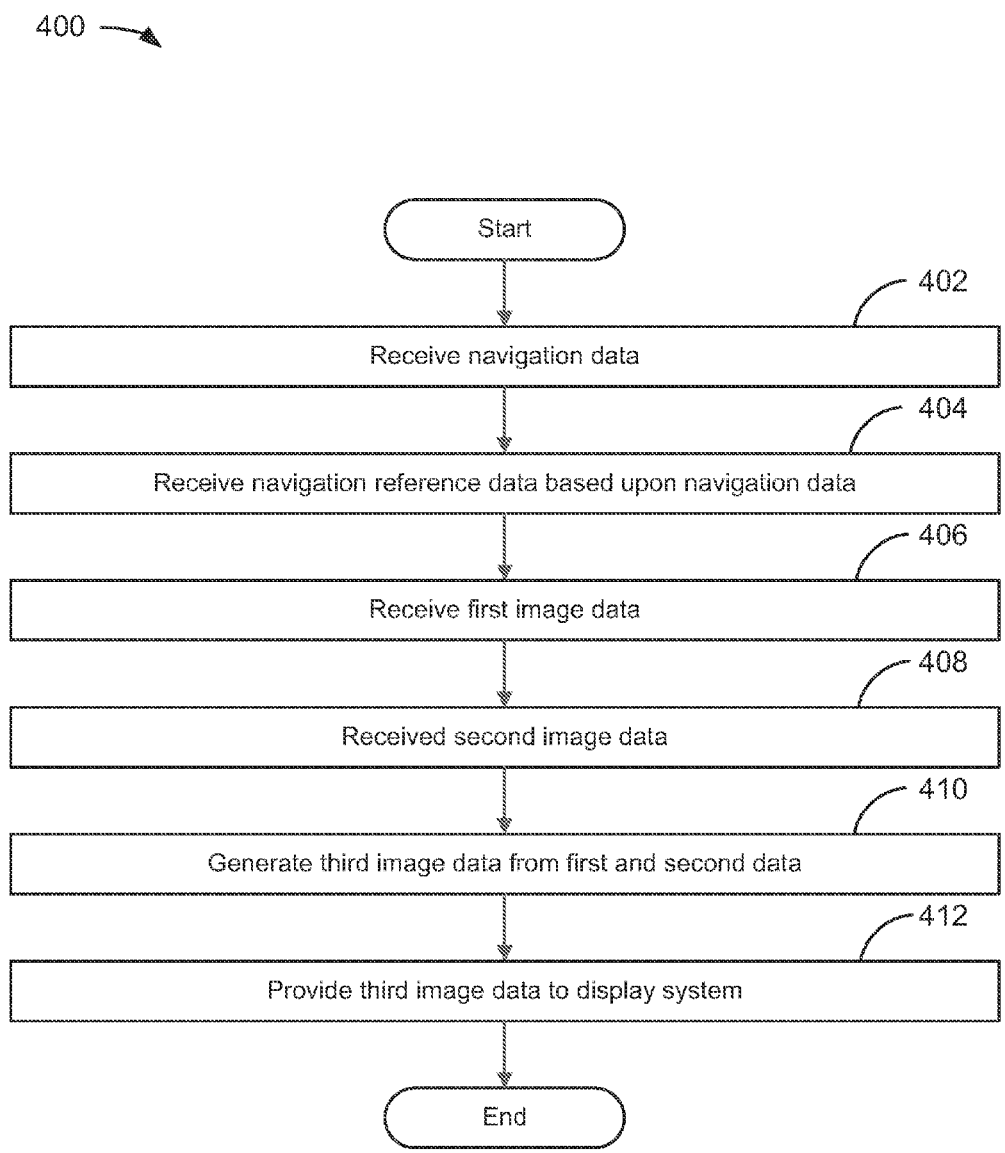
FIG. 7 depicts a flow chart of a second method for combining image data received from multiple vision systems.

FIGS. 6 and 7 depict flowcharts 300 and 400 disclosing examples of methods for combining image data from two or more vision systems, where the IG 140 may be programmed or configured with instructions corresponding to the modules embodied in flowcharts 300 and 400. As embodied herein, the IG 140 may be a processor or a combination of processors found in the display system 150 or any other system suitable for performing the task. Also, the IG 140 may be a processor of a module such as, but not limited to, a printed circuit card having one or more input interfaces to facilitate the two-way data communications of the IG 140, i.e., the receiving and providing of data. As necessary for the accomplishment of the following modules embodied in flowcharts 300 and 400, the receiving of data is synonymous and/or interchangeable with the retrieving of data, and the providing of data is synonymous and/or interchangeable with the making available or supplying of data.

As shown in FIG. 6, flowchart 300 is depicted. The flowchart begins with module 302 with the receiving of navigation data representative of at least aircraft position and a surface of interest. Here, the surface of interest could be the runway of intended landing. Additionally, data representative of aircraft orientation may be received to address the orientation of visual aids as seen on the display unit.

The flowchart continues with module 304 with the receiving of navigation reference data based upon the navigation data. Here, the navigation reference data could be comprised of runway data representative of information corresponding to each runway of interest such as a location of a runway reference point, dimensions, and information corresponding to lighting system(s) employed for the runway. Each runway could employ one or more RLS(s) and/or one or more ALSs.

The flowchart continues with module 306 with the creating of zone data representative of an LAZ for each surface of interest, where each LAZ may be derived using the runway data; however, the derivation of (i.e., the creation of) each LAZ may not be necessary if the navigation reference data retrieved is representative of an LAZ. If the navigation reference data is representative of an LAZ, then this module may not be necessary and excluded from the method.

The flowchart continues with module 308 with the receiving of first image data representative of a scene outside the aircraft. In one embodiment, the first image data could have been provided by a first EVS employing, for example, SWIR sensor(s). In another embodiment, the first image data could be have provided by an SVS.

The flowchart continues with module 310 with the receiving of second image data representative of a scene outside the aircraft. In one embodiment, the second image data could have been provided by a second EVS employing LWIR sensor(s). In an embodiment in which EVSs have provided the first image data and second image data, the method could include the receiving of third image data from an SVS.

The flowchart continues with module 312 with the identifying of third image data as a function of the first image data and the zone data. As discussed above, the third image data could be comprised of the first image data falling within each LAZ. In an additional embodiment in which the first image data has been provided from an EVS, the third image data could be checked for the presence of acceptable information content.

The flowchart continues with module 314 with the generating of fourth image data as a function of the second image data and the third image data. Here, the second image could be modified by replacing part of it with the third image data. If the third image data has been checked for the presence of acceptable information, then the second image could be modified with only that part of third image data corresponding to the acceptable information content. Alternatively, if the third image data has been checked for the presence of acceptable information content, data representative of lighting symbology corresponding to the acceptable information content could be generated and placed over part of the third image data.

In an embodiment employing first image data provided from an SVS and second image data provided from an EVS, fifth image data could be received from a second EVS and checked for the presence of acceptable information content falling within the LAZ. Then, the third image data (e.g., synthetic image data falling within the LAZ) corresponding to acceptable information content of the fifth image data may be used in the generating of the fourth image data.

The flowchart continues with module 316 with the providing of the fourth image data to a display system configured to receive such data. When received, the image of a scene outside the aircraft represented in the fourth image data may be present on one or more display units. As such, situational awareness may be increased by enhancing the pilot's ability to detect or recognize the runway environment. Then, flowchart 300 proceeds to the end.

As shown in FIG. 7, flowchart 400 is depicted. The flowchart begins with module 402 with the receiving of navigation data representative of at least aircraft position and a surface of interest. Here, the surface of interest could be the runway of intended landing. Additionally, data representative of aircraft orientation may be received to address the orientation of visual aids as seen on the display unit.

The flowchart continues with module 404 with the receiving of navigation reference data based upon the navigation data. Here, the navigation reference data could be comprised of runway data representative of information corresponding to each runway of interest such as a location of a runway reference point, dimensions, and information corresponding to lighting system(s) employed for the runway. Each runway could employed one or more RLS(s) and/or one or more ALSs.

The flowchart continues with module 406 with the receiving of first image data representative of a scene outside the aircraft. In one embodiment, the first image data could have been generated or provided by an SVS using data retrieved from the navigation reference source, where such image data could be representative of the lights of each lighting system of one or more surfaces of interest; for example, the SVS could be configured to retrieved lighting system information such as the type and/or location of each light from the source of navigation reference data configured to store such information.

The flowchart continues with module 408 with the receiving of second image data representative of a scene outside the aircraft. In one embodiment, the second image data could have been provided by an EVS. In another embodiment, the second image data could have been provided by a device or system configured to combine image data from two image data sources; an example of such device would be the IG 140 (or another image generator) configured to perform the method of flowchart 300.

The flowchart continues with module 410 with the generating of third image data as a function of the first image data and the second image data. Here, the image of the first image data could be presented against the background of the second image data, whereby two images of one or more individual lights may be presented. When faced with the information provided by two images of the same light, the pilot may perform a visual comparison between the two and make navigation decisions based upon his or her comparison.

The flowchart continues with module 412 with the providing of the third image data to a display system configured to receive such data. When received, the image of a scene outside the aircraft represented in the fourth image data may be present on one or more display units. As such, situational awareness may be increased by enhancing the pilot's ability to detect or recognize the runway environment. Then, flowchart 400 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for combining image data from a plurality of vision systems, such system comprising:
   a source of navigation data;
   a source of navigation reference data;
   a source of first image data;
   a source of second image data;
   an image generator configured to
     receive navigation data representative of a name of at least one airport runway and at least aircraft position data,
     receive navigation reference data representative of a plurality of predetermined numerical locations for at least one named airport runway,
     receive first image data representative of a first image of a scene outside the aircraft,
     receive second image data representative of a second image of a scene outside the aircraft,
     identify third image data as a function of the first image data and lighting awareness zone data representative of a lighting awareness zone for each named airport runway created from or represented in the navigation reference data, where
       the third image data is comprised of first image data falling within the lighting awareness zone for each named airport runway, and
       the lighting awareness zone for each named airport runway is a zone delineated by inner and outer boundaries and encompassing at least a runway lighting system for the named airport runway but excluding the named airport runway, where
         the inner boundary is located
           on runway edges and runway ends of the named airport runway, or
           in between the runway lighting system and both the runway edges and the runway ends of the named airport runway,
     generate fourth image data as a function of the second image data and the third image data, where
       the fourth image data is representative of a third image of a scene outside the aircraft, and
     provide the fourth image data to a display system; and
   the display system configured to
     receive the fourth image data, and
     present the third image.

2. The system of claim 1, wherein the lighting awareness zone further encompasses an approach landing system.

3. The system of claim 1, wherein
   the source of first image data is a first enhanced vision system, and
   the source of second image data is a second enhanced vision system.

4. The system of claim 3, wherein
   the first enhanced vision system is configured with at least one first sensor,
   the second enhanced vision system is configured with at least one second sensor, or both.

5. The system of claim 3, wherein
   the image generator is further configured to
     determine acceptable information content of the third image data, where
       acceptable information content corresponds to an acquisition of light, such that
         the third image data used in the function for generating the fourth image data consists of third image data of acceptable information content.

6. The system of claim 3, wherein
   the image generator is further configured to
     determine acceptable information content of the third image data, where
       acceptable information content corresponds to an acquisition of light, such that
         the third image data used in the function for generating the fourth image data consists of third image data of acceptable information content, wherein
           the fourth image data is representative of an enhanced image overlaid by lighting symbology corresponding to the acceptable information content.

7. The system of claim 1, wherein
   the source of first image data is a synthetic vision system, and
   the source of second image data is a first enhanced vision system.

8. The system of claim 1, wherein the display system is comprised of the image generator.

9. A system for combining image data from a plurality of vision systems, such system comprising:
   a source of navigation data;
   a source of first image data comprised of a synthetic vision system;
   a source of image data;
   a first image generator configured to
     receive navigation data representative of a name of at least one airport runway and at least aircraft position data,
     receive first image data from the synthetic vision system, where
       the first image data is representative of a first image of only a plurality of individual lights of at least one lighting system employed for at least one named airport runway, and navigation reference data representative of a plurality of predetermined numerical locations for at least one named airport runway and maintained in a source of navigation reference data provides a basis for which the first image data is generated, receive second image data representative of a second image, generate third image data as a function of the first image data and the second image data, where the first image is presented against the background of the second image, such that the individual lights of at least one lighting system employed for at least one named airport runway are presented in two images simultaneously, and provide the third image data to a display system; and the display system configured to receive the third image data, and present the two images to a viewer.

10. The system of claim 9, wherein the source of second image data is a first enhanced vision system.

11. The system of claim 9, wherein the source of second image data is the first image generator or a second image generator configured to generate the second image data from a first enhanced vision system and a second enhanced vision system.

12. The system of claim 9, wherein the display system is comprised of the image generator.

13. A method for combining image data from a plurality of vision systems, such method comprising:

receiving navigation data representative of a name of at least one airport runway and at least aircraft position data;

receiving navigation reference data representative of a plurality of predetermined numerical locations for at least one named airport runway;

receiving first image data from a first source, where the first image data is representative of a first image of a scene outside the aircraft;

receiving second image data from a second source, where the second image data is representative of a second image of a scene outside the aircraft;

identifying third image data as a function of the first image data and lighting awareness zone data representative of a lighting awareness zone for each named airport runway created from or represented in the navigation reference data, where the third image data is comprised of first image data falling within the lighting awareness zone for each named airport runway, and the lighting awareness zone for each named airport runway is a zone delineated by inner and outer boundaries and encompassing at least a runway lighting system for the named airport runway but excluding the named airport runway, where the inner boundary is located on runway edges and runway ends of the named airport runway, or in between the runway lighting system and both the runway edges and the runway ends of the named airport runway;

generating fourth image data as a function of the second image data and the third image data, where the fourth image data is representative of a third image of a scene outside the aircraft; and providing the fourth image data to a display system, whereby the third image is presentable to a viewer.

14. The method of claim 13, wherein the lighting awareness zone further encompasses an approach landing system.

15. The method of claim 13, wherein the first source is a first enhanced vision system, and the second source is a second enhanced vision system.

16. The method of claim 15, further comprising:

determining acceptable information content of the third image data, where acceptable information content corresponds to an acquisition of light, such that the third image data used in the function for generating the fourth image data consists of third image data of acceptable information content.

17. The method of claim 15, further comprising:

determining acceptable information content of the third image data, where acceptable information content corresponds to an acquisition of light, such that the third image data used in the function for generating the fourth image data consists of third image data of acceptable information content, wherein the fourth image data is representative of an enhanced image overlaid by lighting symbology corresponding to the acceptable information content.

18. The method of claim 13, wherein the first source is a synthetic vision system, and the second source is a first enhanced vision system.

19. The method of claim 18, further comprising:

receiving fifth image data from a third source; and determining acceptable information content of the fifth image data falling within each lighting awareness zone, where acceptable information content corresponds to an acquisition of light, such that the third image data used in the function for generating the fourth image data consists of third image data corresponding to the acceptable information content of the fifth image data.

20. A method for combining image data from a plurality of vision systems, such method comprising:

receiving navigation data representative of a name of at least one airport runway and at least aircraft position data;

receiving first image data from a synthetic vision system, where the first image data is representative of a first image of only a plurality of individual lights of at least one lighting system employed for at least one named airport runway, where navigation reference data representative of a plurality of predetermined numerical locations values for at least one named airport runway and maintained in a source of navigation reference data provides a basis for which the first image data is generated;

receiving second image data representative of a second image from a second image data source;

generating third image data as a function of the first image data and the second image data, where the first image is presented against the background of the second image, such that the individual lights of at least one lighting system employed for at least one named airport runway are presented in two images simultaneously; and providing the third image data to a display system, whereby the two images are presentable to a viewer.

21. The method of claim 20, wherein the second image data source is an enhanced vision system.

22. The method of claim 20, wherein the second image data source is an image generator configured to generate the second image data from a first enhanced vision system and a second enhanced vision system.

* * * * *